US011476999B2

(12) United States Patent
Cheng et al.

(10) Patent No.: US 11,476,999 B2
(45) Date of Patent: Oct. 18, 2022

(54) CONTROL PLANE DESIGN FOR BANDWIDTH PART IN NEW RADIO

(71) Applicant: QUALCOMM incorporated, San Diego, CA (US)

(72) Inventors: Peng Cheng, Beijing (CN); Keiichi Kubota, Tokyo (JP); Peter Pui Lok Ang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/757,978

(22) PCT Filed: Nov. 16, 2018

(86) PCT No.: PCT/CN2018/115927
§ 371 (c)(1),
(2) Date: Apr. 21, 2020

(87) PCT Pub. No.: WO2019/096254
PCT Pub. Date: May 23, 2019

(65) Prior Publication Data
US 2020/0344030 A1    Oct. 29, 2020

(30) Foreign Application Priority Data

Nov. 17, 2017  (WO) .......................... CN2017/111522
May 21, 2018   (WO) .......................... CN2018/087647

(51) Int. Cl.
*H04L 5/00*    (2006.01)
*H04W 76/30*   (2018.01)
(Continued)

(52) U.S. Cl.
CPC .......... *H04L 5/0092* (2013.01); *H04L 5/0098* (2013.01); *H04W 8/24* (2013.01);
(Continued)

(58) Field of Classification Search
CPC .... H04L 5/0092; H04L 5/0098; H04W 28/20; H04W 72/0453; H04W 72/048; H04W 72/0833; H04W 76/27; H04W 76/30
See application file for complete search history.

(56) References Cited

U.S. PATENT DOCUMENTS 9,338,695 B2    5/2016  Kitazoe et al.
10,477,537 B2   11/2019 Rico Alvarino et al.
(Continued)

FOREIGN PATENT DOCUMENTS

CN    101155400 A    4/2008
CN    101615984 A    12/2009
(Continued)

OTHER PUBLICATIONS

Samsung; "RAN2 impacts from bandwidth part in NR"; 3GPP TSG-RAN WG2 NR #98 Meeting Hangzhou, China, May 15-19, 2017; R2-1704503 (Year: 2017).*
(Continued)

*Primary Examiner* — Gary Mui
(74) *Attorney, Agent, or Firm* — Patterson + Sheridan, L.L.P.

(57) ABSTRACT

Techniques and apparatus for a control plane design for bandwidth part (BWP) in new radio (NR) are provided. One technique includes sending information with an indication of a BWP capability of a user equipment (UE) to a base station (BS). A configuration from the BS indicating a set of BWPs available to use for communication is received in response to the indication. Communications are performed on at least one of the set of BWPs. Another technique includes receiving information having an indication of a BWP capability of the UE. A configuration indicating a set of BWPs available for the UE to use for communication is determined. The configuration is sent to the UE.

116 Claims, 11 Drawing Sheets

(51) Int. Cl.

| | | |
|---|---|---|
| *H04W 76/27* | (2018.01) | |
| *H04W 8/24* | (2009.01) | |
| *H04W 28/20* | (2009.01) | |
| *H04W 72/04* | (2009.01) | |
| *H04W 74/08* | (2009.01) | |

(52) U.S. Cl.
CPC ....... *H04W 28/20* (2013.01); *H04W 72/0453* (2013.01); *H04W 74/0833* (2013.01); *H04W 76/27* (2018.02); *H04W 76/30* (2018.02)

(56) References Cited

U.S. PATENT DOCUMENTS

| | | | |
|---|---|---|---|
| 2016/0255626 A1 | 9/2016 | Koulakiotis et al. | |
| 2017/0019163 A1* | 1/2017 | Yoshimoto | H04L 1/00 |
| 2017/0085346 A1* | 3/2017 | Tiirola | H04W 74/00 |
| 2017/0230869 A1 | 8/2017 | Kubota et al. | |
| 2018/0183551 A1* | 6/2018 | Chou | H04L 5/0042 |
| 2018/0242319 A1* | 8/2018 | Akkarakaran | H04W 72/042 |
| 2018/0279310 A1* | 9/2018 | Chen | H04W 72/048 |
| 2019/0044689 A1* | 2/2019 | Yiu | H04W 72/042 |
| 2019/0045549 A1* | 2/2019 | Wu | H04W 72/085 |
| 2019/0045571 A1* | 2/2019 | Wu | H04W 76/15 |
| 2019/0052377 A1* | 2/2019 | Hwang | H04B 17/309 |
| 2019/0082425 A1* | 3/2019 | Li | H04W 56/0005 |
| 2019/0103954 A1* | 4/2019 | Lee | H04W 72/042 |
| 2019/0132845 A1* | 5/2019 | Babaei | H04W 72/042 |
| 2019/0150173 A1* | 5/2019 | Lee | H04W 72/1289 370/329 |
| 2019/0199503 A1* | 6/2019 | Son | H04L 5/0053 |
| 2019/0281489 A1* | 9/2019 | Hong | H04L 5/0064 |
| 2019/0373667 A1* | 12/2019 | Jeon | H04L 5/0044 |
| 2020/0059345 A1* | 2/2020 | Pelletier | H04L 1/1657 |
| 2020/0059930 A1* | 2/2020 | Lee | H04W 72/048 |
| 2020/0120488 A1* | 4/2020 | Liu | H04L 5/00 |
| 2020/0213066 A1* | 7/2020 | Ma | H04W 72/04 |
| 2020/0267583 A1* | 8/2020 | Cheng | H04W 48/16 |
| 2020/0280970 A1* | 9/2020 | Takeda | H04L 27/26 |
| 2020/0296725 A1* | 9/2020 | Tang | H04W 72/0453 |
| 2020/0305186 A1* | 9/2020 | Alfarhan | H04W 72/14 |
| 2020/0313832 A1* | 10/2020 | Kim | H04W 24/10 |
| 2020/0351946 A1* | 11/2020 | Pang | H04W 72/042 |
| 2020/0367050 A1* | 11/2020 | Yang | H04L 5/0092 |
| 2020/0374725 A1* | 11/2020 | Chen | H04B 7/0626 |
| 2020/0389282 A1* | 12/2020 | Turtinen | H04L 5/0092 |

FOREIGN PATENT DOCUMENTS

| | | |
|---|---|---|
| CN | 102045865 A | 5/2011 |
| DE | 102006025880 A1 | 12/2007 |
| WO | 2011015097 A1 | 2/2011 |
| WO | 2013082303 | 6/2013 |
| WO | 2015062918 A1 | 5/2015 |
| WO | 2017139050 A1 | 8/2017 |
| WO | 2017139540 A1 | 8/2017 |

OTHER PUBLICATIONS

Guangdong Oppo Mobile Telecom: "Bandwidth Part Based Resource Scheduling for Carrier Aggregation" 3GPP Draft, R1-1710171, 3rd Generation Partnership Project (3GPP) Mobile Competence Centre, 650 Route Des Lucioles, F-06921 Sophia-Antipolis Cedex, France vol. RAN WG1 No. Qingdao, P.R. China, Jun. 27, 2017-Jun. 30, 2017, Jun. 26, 2017 (Jun. 26, 2017), XP051299395, pp. 1-3, Retrieved from the Internet: URL:http://www.3gpp.org/ftp/Meetings_3GPP_SYNC/RAN1/Docs/ [retrieved on Jun. 26, 2017].

Huawei, Hisilicon, "Resource Allocation and Indication for Data Channel," 3GPP TSG RAN WG1 Meeting #88bis, R1-1705069, Apr. 7, 2017, 8 pages.
Huawei, et al., "Remaining Issues on Bandwidth Part," 3GPP Draft; R1-1717077, 3rd Generation Partnership Project (3GPP), Mobile Competence Centre, 650, Route Des Lucioles, F-06921 Sophia-Antipolis Cedex, France, vol. RAN WG1, No. Prague, Czech Republic; Oct. 9, 2017-Oct. 13, 2017, Oct. 8, 2017, 11 Pages, XP051340268, Retrieved from the Internet: URL: http://www.3gpp.org/ftp/Meetings_3GPP_SYNC/RAN1/Docs/ and URL: http://www.3gpp.org/ftp/tsg_ran/WG1_RL1/TSGR1_90b/Docs/ [retrieved on Oct. 8, 2017, Figures 5,6, par. below Issue 2, Issue 3, Proposal 9.
Interdigital Inc., "Coreset Monitoring Under Dynamic Change of BWP," 3GPP TSG RAN WG1 NR Ad-Hoc #2, R1-1710872, Jun. 30, 2017, 5 pages.
International Search Report and Written Opinion—PCT/CN2018/087647—ISA/EPO—dated Aug. 16, 2018.
International Search Report and Written Opinion—PCT/CN2017/111522—ISA/EPO—dated Jun. 27, 2018.
International Search Report and Written Opinion—PCT/CN2018/115927—ISA/EPO—dated Feb. 20, 2019.
Panasonic: "On Default Bandwidth Part," 3GPP TSG-RAN WG1 NR Ad-Hoc#2, R1-1710787, Jun. 30, 2017, 5 pages.
Qualcomm Incorporated, "WF on Channel Bandwidth," R4-1706321, 3GPP TSG-RAN WG4 RAN4 #83, Hangzhou, China, May 25-19, 2017, 6 pages.
Samsung, "The Impact of Bandwidth Part on RAN2: Overview and Issues," 3GPP TSG RAN WG2, #99bis, R2-1711595, Oct. 13, 2017, 8 pages.
Intel Corporation: "On UE Bandwidth Support in NR", 3GPP TSG-RAN NR Adhoc #3, 3GPP Draft, R4-1709407 UE BW Support, 3rd Generation Partnership Project (3GPP), Mobile Competence Centre; 650, Route Des Lucioles, F-06921 Sophia-Antipolis Cedex; France, vol. TSG RAN, No. Nagoya, Japan; Sep. 19, 2017-Sep. 21, 2017, Sep. 11, 2017 (Sep. 11, 2017), XP051331890, 5 Pages, Retrieved from the Internet: URL: http://www.3gpp.org/ftp/tsg_ran/WG4_Radio/TSGR4_AHs/TSGR4_NR_Sep2017/Docs/ [retrieved on Sep. 11, 2017], p. 1-p. 4.
Mediatek Inc: "Further Details on Bandwidth Part Operation in NR", 3GPP TSG RAN WG1 Meeting #90, 3GPP Draft; R1-1713978 Further Details on Bandwidth Part Operation in NR, 3rd Generation Partnership Project (3GPP), Mobile Competence Centre, 650, Route Des Lucioles, F-06921 Sophia-Antipolis Cedex, vol. RAN WG1, No. Prague, Czech Republic, Aug. 21, 2017-Aug. 25, 2017, Aug. 20, 2017 (Aug. 20, 2017), 10 Pages, XP051316770, Retrieved from the Internet: URL: http://www.3gpp.org/ftp/Meetings_3GPP_SYNC/RAN1/Docs/, [retrieved on Aug. 20, 2017].
NTT Docomo., et al., "Remaining Issues on Bandwidth Parts for NR", 3GPP Draft, R1-1718223 BW Parts for NR, 3rd Generation Partnership Project (3GPP), Mobile Competence Centre, 650, Route Des Lucioles, F-06921 Sophia-Antipolis Cedex, France, vol. RAN WG1. No. Prague, CZ, Oct. 9, 2017-Oct. 13, 2017, Oct. 3, 2017 (Oct. 3, 2017), pp. 1-4, XP051352931, Retrieved from the Internet: URL: https://www.3gpp.org/ftp/tsg_ran/WG1_RL1/TSGR1_90b/Docs [retrieved on Oct. 3, 2017], p. 1-p. 3; figure 1.
Samsung: "Framework to Support Bandwidth Parts in NR", 3GPP TSG-RAN WG2 NR #99bis Meeting, 3GPP Draft, R2-1711187, 3rd Generation Partnership Project (3GPP), Mobile Competence Centre, 650, Route Des Lucioles, F-06921 Sophia-Antipolis Cedex, F, vol. RAN WG2, No. Prague, Czech, Oct. 9-13, 2017, Oct. 8, 2017, 8 Pages, XP051343194, Retrieved from the Internet: URL: http://www.3gpp.org/ftp/Meetings_3GPP_SYNC/RAN2/Docs/, [retrieved on Oct. 8, 2017], p. 1-p. 5; figures 1-3.
Supplementary European Search Report—EP18877817—Search Authority—The Hague—dated Jul. 20, 2021.
Taiwan Search Report—TW107140754—TIPO—dated May 31, 2022.

\* cited by examiner

CONTROL PLANE DESIGN FOR BANDWIDTH PART IN NEW RADIO

CROSS-REFERENCE TO RELATED APPLICATIONS & PRIORITY CLAIM

This application for Patent is a national stage application under 35 U.S.C. § 371 of PCT/CN2018/115927, filed Nov. 16, 2018, which claims the benefit of and priority to International Patent Cooperation Treaty Application No. PCT/CN2018/087647, filed May 21, 2018, and International Patent Cooperation Treaty Application No. PCT/CN2017/111522, filed Nov. 17, 2017, all of which are assigned to the assignee hereof and hereby expressly incorporated by reference herein as if fully set forth below and for all applicable purposes.

TECHNICAL FIELD

The present disclosure relates generally to wireless communication systems, and more particularly, to a control plane design for bandwidth part (BWP) in new radio (NR).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide method for wireless communication by a user equipment (UE). The method generally includes sending information comprising an indication of a bandwidth part (BWP) capability of the UE to a base station (BS). The method also includes receiving, in response to the indication, a configuration from the BS indicating a set of BWPs available to use for communication. The method further includes performing communications on at least one of the set of BWPs.

Certain aspects provide a method for wireless communication by a base station (BS). The method generally includes receiving, from a user equipment (UE), information comprising an indication of a bandwidth part (BWP) capability of the UE. The method also includes determining, based on the indication, a configuration indicating a set of BWPs available for the UE to use for communication. The method further includes sending the configuration to the UE.

Certain aspects provide an apparatus for wireless communications. The apparatus generally includes at least one processor, a transmitter, a receiver, and a memory coupled to the at least one processor. The transmitter is configured to transmit information comprising an indication of a bandwidth part (BWP) capability of the apparatus to a base station (BS). The receiver is configured to receive, in response to the indication, a configuration from the BS indicating a set of BWPs available to use for communication. The at least one processor is configured to perform communications on at least one of the set of BWPs.

Certain aspects provide an apparatus for wireless communications. The apparatus generally includes at least one processor, a transmitter, a receiver, and a memory coupled to the at least one processor. The receiver is configured to receive, from a user equipment (UE), information comprising an indication of a bandwidth part (BWP) capability of the UE. The at least one processor is configured to determine, based on the indication, a configuration indicating a set of BWPs available for the UE to use for communication. The transmitter is configured to transmit the configuration to the UE.

Certain aspects provide an apparatus for wireless communications. The apparatus generally includes means for sending information comprising an indication of a bandwidth part (BWP) capability of the apparatus to a base station (BS). The apparatus also includes means for receiving, in response to the indication, a configuration from the BS indicating a set of BWPs available to use for communication. The apparatus further includes means for performing communications on at least one of the set of BWPs.

Certain aspects provide an apparatus for wireless communications. The apparatus generally includes means for receiving, from a user equipment (UE), information comprising an indication of a bandwidth part (BWP) capability of the UE. The apparatus also includes means for determining, based on the indication, a configuration indicating a set of BWPs available for the UE to use for communication. The apparatus further includes means for sending the configuration to the UE.

Certain aspects of the present disclosure provide a computer-readable medium having computer executable code stored thereon for wireless communication by an apparatus. The computer executable code generally includes code for sending information comprising an indication of a bandwidth part (BWP) capability of the apparatus to a base station (BS). The computer executable code also includes code for receiving, in response to the indication, a configuration from the BS indicating a set of BWPs available to use for communication. The computer executable code further includes code for performing communications on at least one of the set of BWPs.

Certain aspects of the present disclosure provide a computer-readable medium having computer executable code stored thereon for wireless communication by an apparatus. The computer executable code generally includes code for receiving, from a user equipment (UE), information comprising an indication of a bandwidth part (BWP) capability of the UE. The computer executable code also includes code for determining, based on the indication, a configuration indicating a set of BWPs available for the UE to use for communication. The computer executable code further includes code for sending the configuration to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
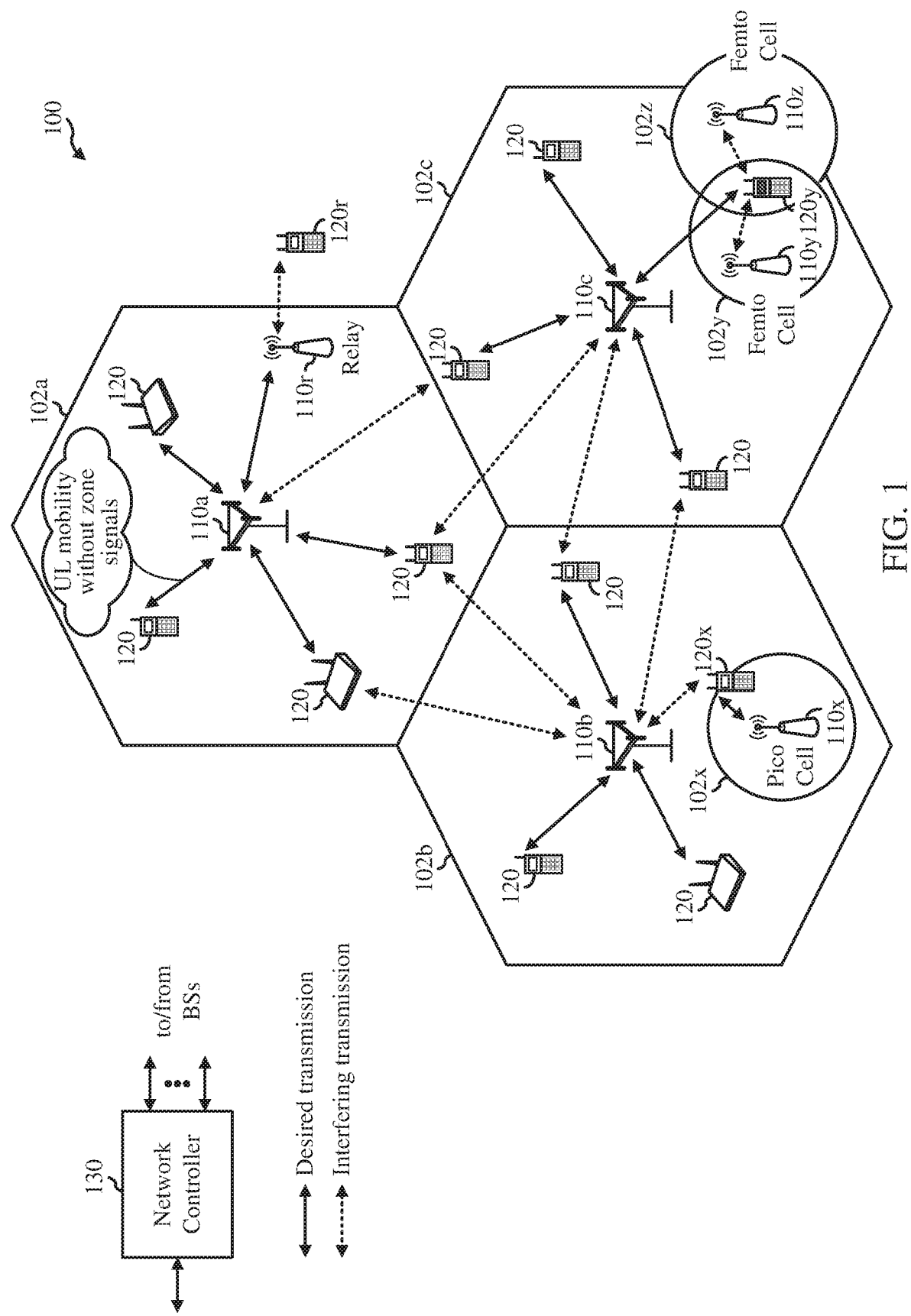
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects provide techniques and apparatus for a control plane design for bandwidth part (BWP) in NR. In particular, aspects provide techniques for configuring a UE with a set of BWPs to use for communication, based on a BWP capability of the UE. Using aspects presented herein, a UE may report its BWP capability to the gNB (e.g., in a UE capability enquiry procedure). The gNB may determine a set of BWPs available for the UE to use for communication, based in part on the BWP capability of the UE. The gNB may send a (re)-configuration comprising the set of BWPs to the UE. The UE may use the set of BWPs for one or more procedures (e.g., radio resource control (RRC) procedures, mobility procedures, paging procedures, etc.) in NR. As described in more detail below, in some aspects, the gNB may re-configure the particular set of BWPs for the UE, based on the particular procedure in NR.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA). Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP), cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and evolved NB (eNB), NB, 5G NB, Next Generation NB (gNB), access point (AP), BS, NR BS, 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relays station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist hand, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

In FIG. 1, a solid line with double arrows indicates desired transmissions between a UE and a serving BS, which is a BS designated to serve the UE on the downlink and/or uplink A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, subbands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR (in one reference example) are described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
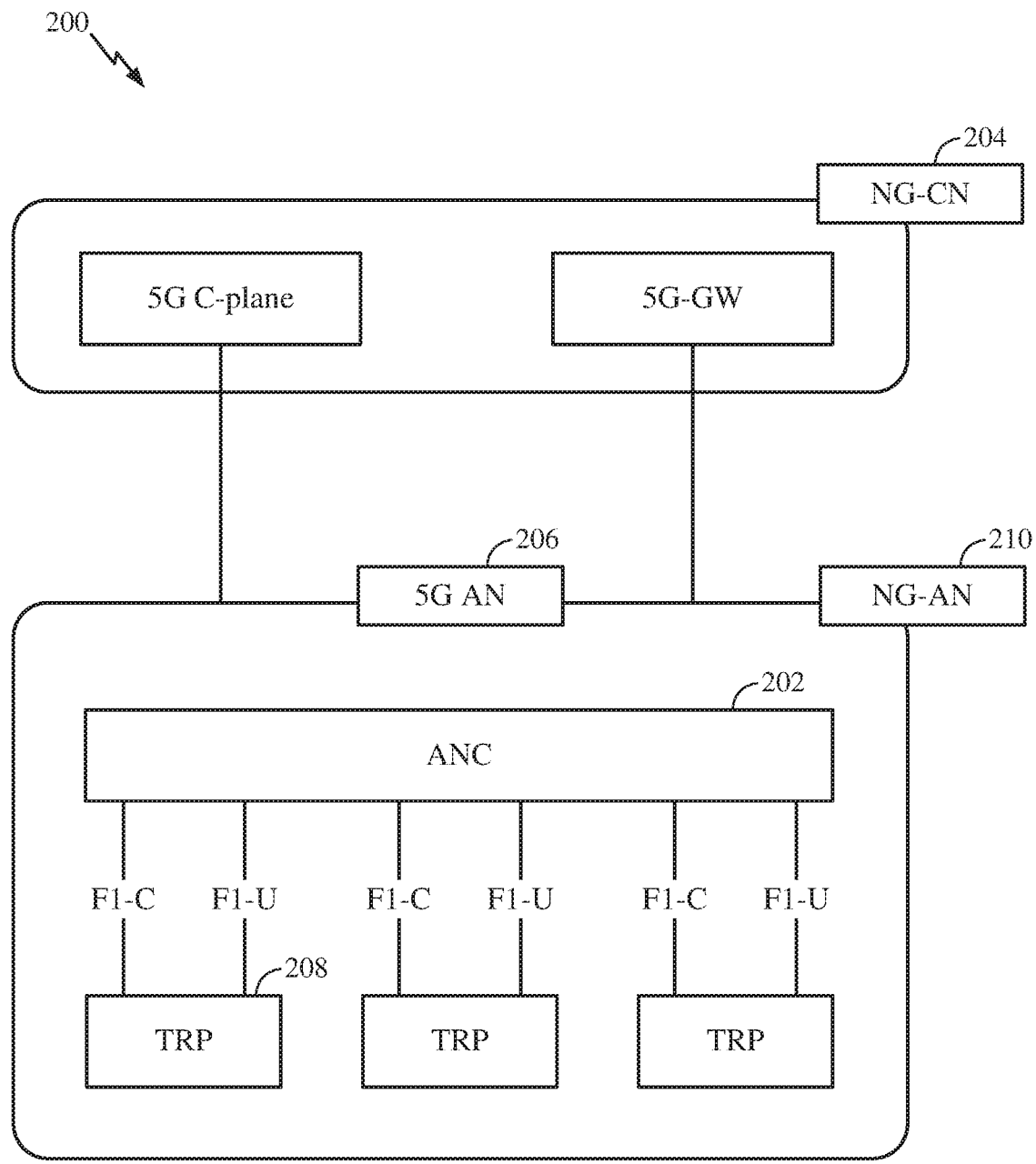
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208. As described above, a TRP may be used interchangeably with "cell".

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP 208 may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may not be present.

The logical architecture may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a central unit (CU) (e.g., ANC 202) and/or one or more distributed units (e.g., one or more TRPs 208).

Figure 3:
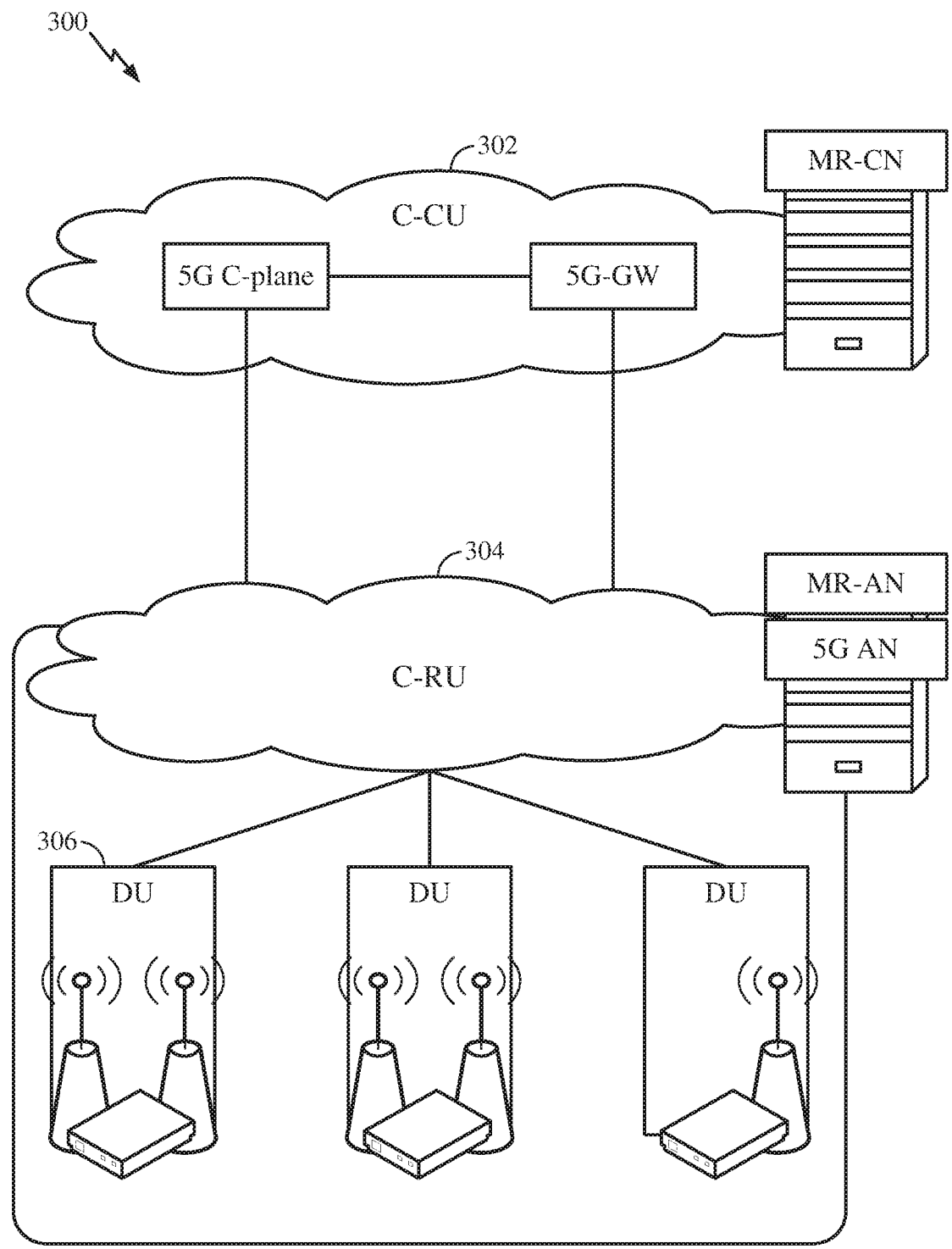
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity. A centralized RAN unit (C-RU) 304 may host one or more ANC functions. The C-RU 304 may host core network functions locally. The C-RU 304 may have distributed deployment. The C-RU 304 may be close to the network edge. A DU 306 may host one or more TRPs. The DU 306 may be located at edges of the network with radio frequency (RF) functionality.

Figure 4:
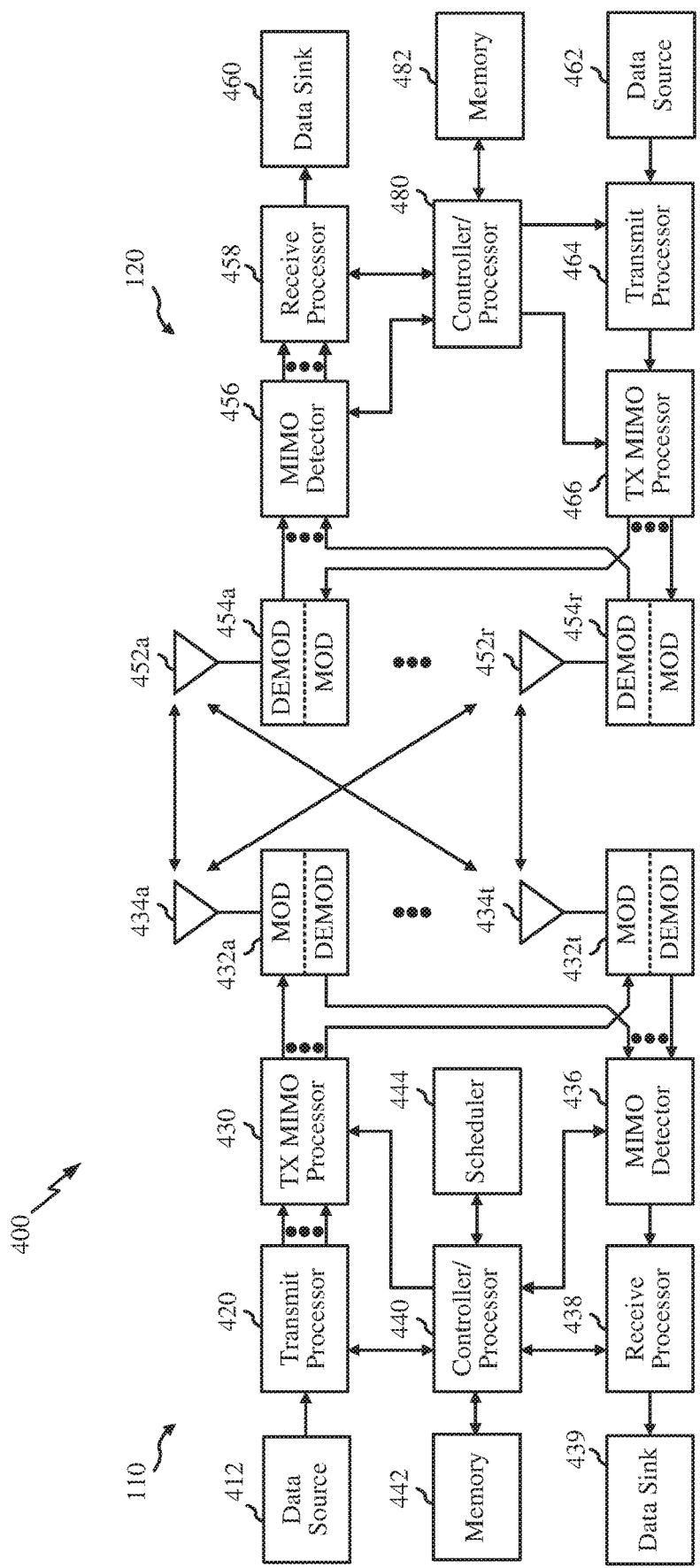
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller processor of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODS) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described, herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a trans processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10 and/or other processes for the techniques described herein. The processor 480 and/or other processors and modules at the UE 120 may also perform or direct, e.g., the execution of the functional blocks illustrated in FIG. 9 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
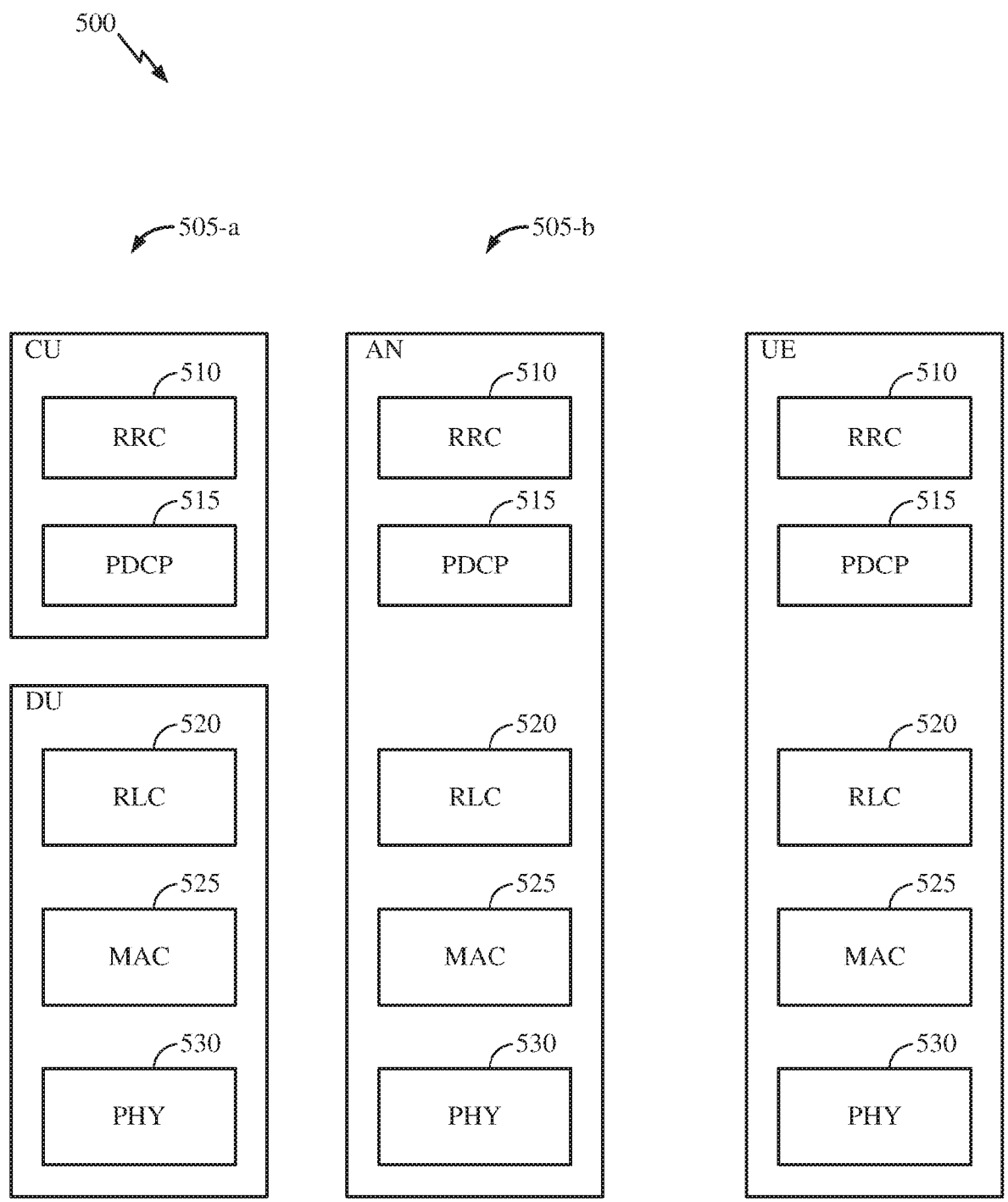
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515 the RLC layer 520, the MAC layer 525, and the PHY layer 530).

Figure 6:
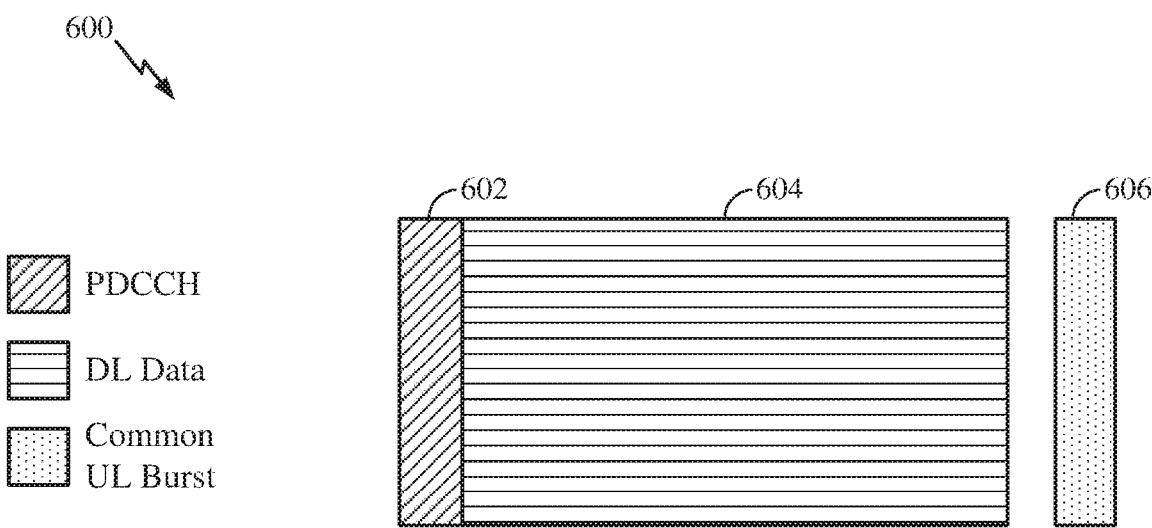
FIG. 6 illustrates an example of a downlink-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
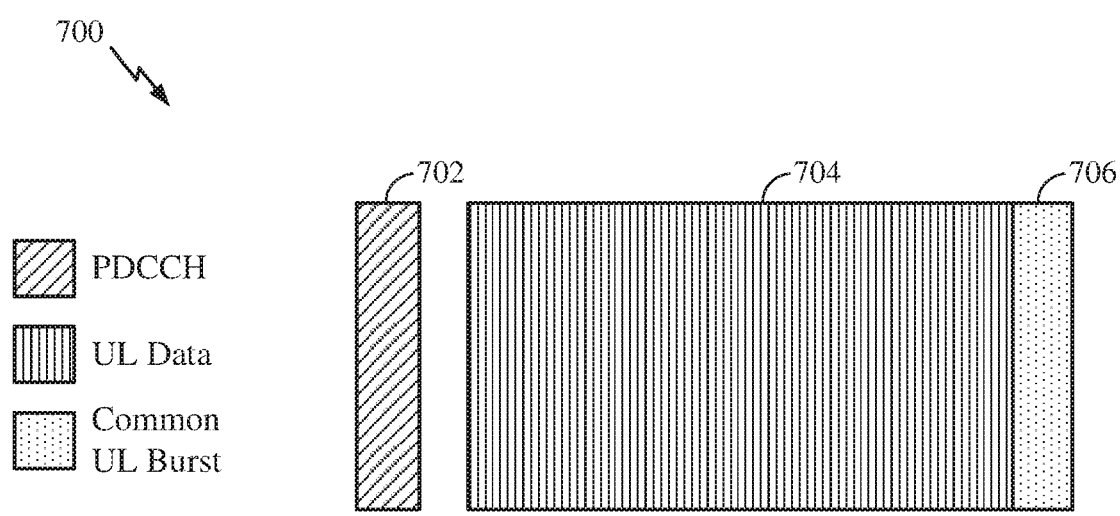
FIG. 7 illustrates an example of an uplink-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Control Plane Design for BWP in NR

Certain wireless communication systems (e.g., such as NR) may support operations (e.g., RRC operations, mobility operations, paging/system information operations, etc.) with one or more different portions of bandwidth (or bandwidth parts (BWPs)) within one or more carriers of the cell. The BWP may be defined by a particular frequency range, center frequency, and/or numerology. Supporting BWPs may enable a communication system (e.g., NR) to support UEs with less receiver bandwidth capability than a whole system bandwidth and/or optimize UE power consumption. For example, in some cases, the maximum bandwidth per carrier (e.g., in NR) may be 400 MHz, where a given UE may have a lower maximum receive bandwidth (e.g., 20 MHz, 100 MHz, etc.).

For a connected UE, one or more multiple UE-specific BWPs can be configured via RRC signaling. In some cases, one or more BWPs can be orthogonal or (partially) overlapped with one or more other BWPs. In addition, NR may support different numerologies, frequency location, and/or bandwidth for each BWP. As used herein, the term numerology generally refers to a set of parameters that define a structure of time and frequency resources used for communication. Such parameters may include, for example, subcarrier spacing, type of cyclic prefix (CP) (e.g., such as normal CP or extended CP), and transmission time intervals (TTIs) (e.g., such as subframe or slot durations).

In Rel-15, a UE may be configured with multiple BWPs (e.g., for each carrier). However, there is generally at most one active downlink (DL) BWP and at most one active uplink (UL) BWP for the UE at a given time for a serving cell. From the UE's perspective, a cell may be associated with a single block of synchronization signal (SS) resources. When in an idle/inactive state, the UE may search for a SS block with remaining minimum system information (RMSI), and may regard the associated BWP of the cell as the initial active BWP. In some cases, NR may enable a single scheduling downlink control information (DCI) to switch the UE's active BWP from one BWP to another BWP (of the same link direction within a given serving cell).

Figure 8:
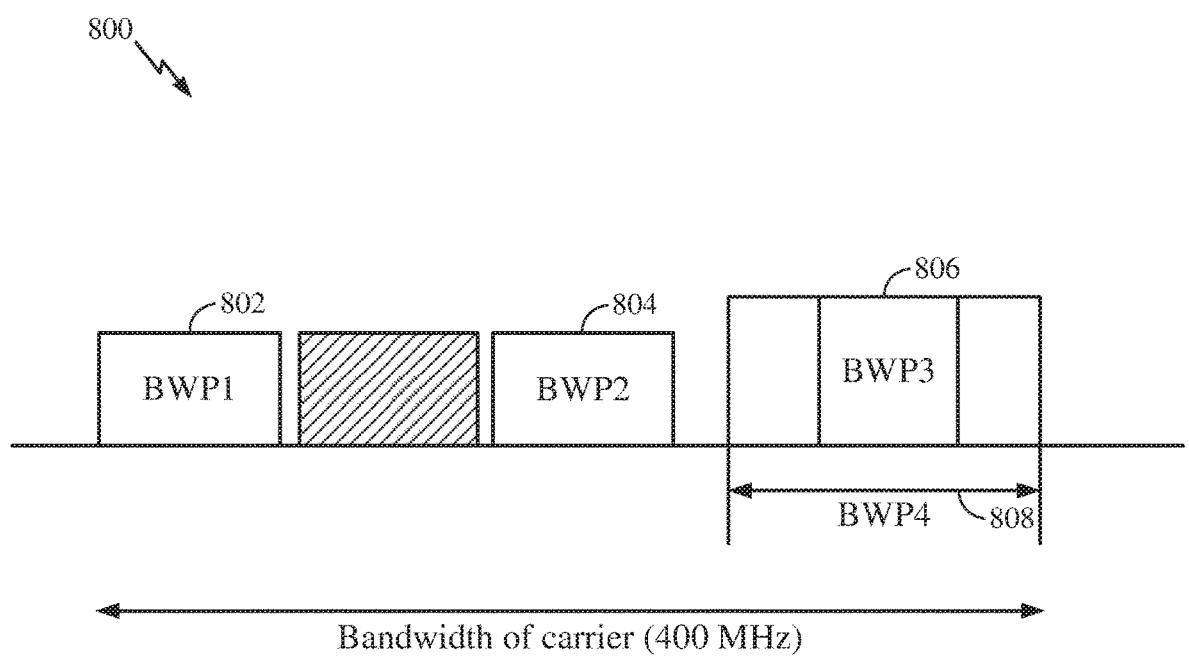
FIG. 8 illustrates an example deployment use scenarios of BWP in a communication system, in accordance with certain aspects of the present disclosure.

FIG. 8 illustrates example deployment use scenarios of BWPs in a communication system (e.g., Rel-15), according to certain aspects of the present disclosure. As shown in this example, the maximum bandwidth of the carrier 800 is 400 MHz, and the carrier 800 may be configured with multiple BWPs (e.g., BWP1 802, BWP2 804, BWP3 806 and BWP4 808), each having a bandwidth that is a subset (e.g., 20 MHz, 100 MHz, etc.) of the carrier bandwidth.

In some aspects, the communication system may use BWP(s) to support a UE's reduced bandwidth capability. As shown in FIG. 8, assuming the UE's receiver bandwidth capability is 100 MHz, the gNB can configure the UE with BWP1 802, which has a bandwidth of 100 MHz. In some cases, the gNB can quickly indicate which of the BWPs the UE can use with DCI. In this manner, the gNB can support UEs that have a reduced bandwidth capability.

In some aspects, the communication system may also support the use of BWPs with intra-band carrier aggregation (CA). For example, as shown in FIG. 8, a UE can be configured with BWP1 802 and BWP2 804, which can be non-contiguous. In some cases, if multiple non-contiguous BWPs are activated at the same time, the BWPs may work jointly with CA. In some cases, CA may be replaced by BWP(s).

In some aspects, the communication system may use BWP(s) to optimize the UE's power consumption. For example, in some cases, the UE can be configured with two BWPs that have the same center frequency. As shown in FIG. 8, the UE can be configured with a BWP3 806 and a BWP4 808 that have the same center frequency, but where BWP4 808 has a wider bandwidth than BWP3 806. In such a configuration, the gNB can configure the UE to use BWP3 806 to monitor for control channels, and configure the UE to receive data on BWP4 808. Thus, if the UE wants to receive data, it can switch to BWP4 808 to receive data (e.g., PDSCH).

As noted above, aspects presented herein provide techniques for optimizing the configuration of BWPs for one or more procedures in NR. Such procedures, for example, may include RRC procedures, mobility (e.g., handover) procedures, paging procedures, etc.

Figure 9:
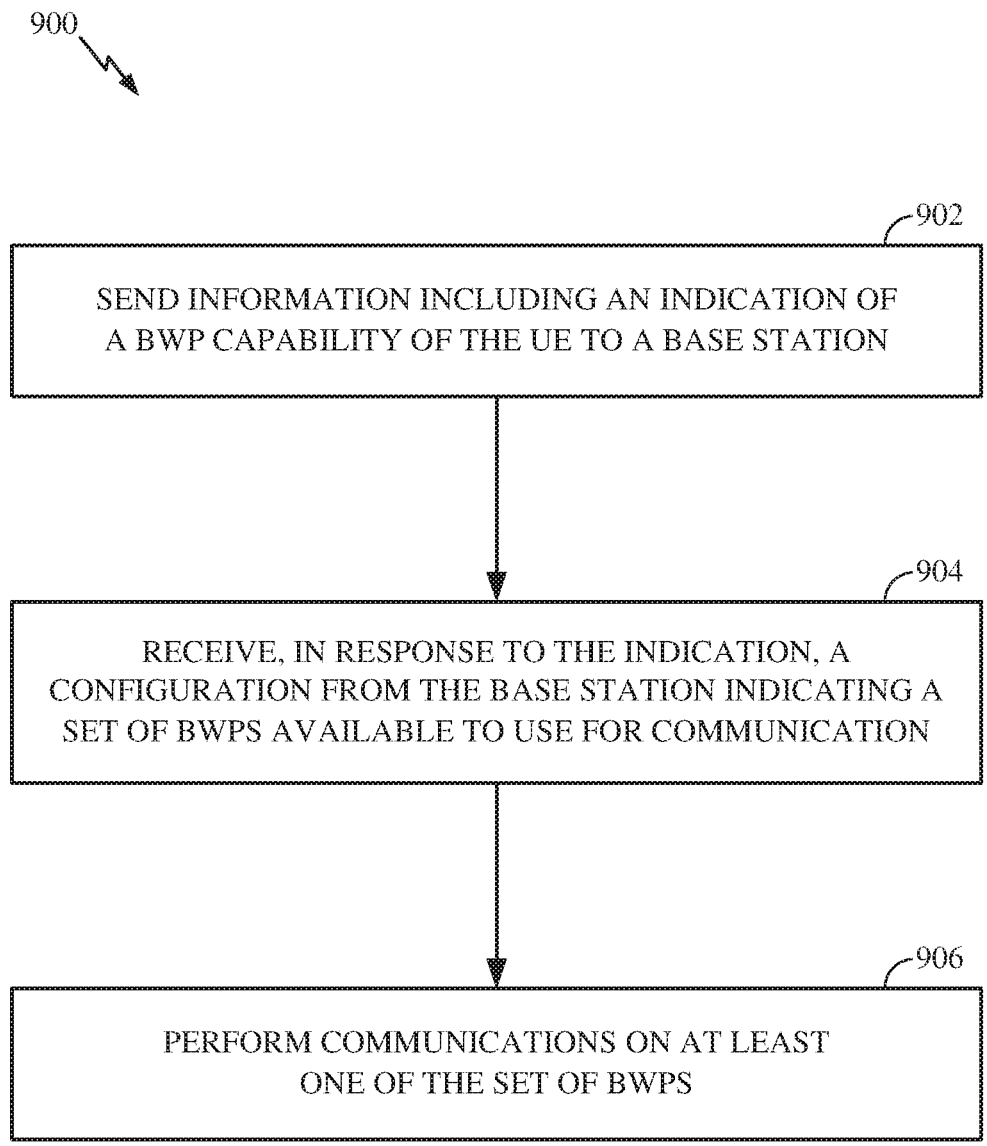
FIG. 9 illustrates example operations for wireless communications performed by a user equipment, in accordance with certain aspects of the present disclosure.

FIG. 9 illustrates example operations 900 for wireless communications, in accordance with aspects of the present disclosure. Operations 900 may be performed, for example, by a UE, such as UE 120 shown in FIG. 1.

Operations 900 begin, at 902, where the UE sends information that includes an indication of a BWP capability of the UE to a base station (e.g., gNB). At 904, the UE receives, in response to the indication, a configuration from the base station indicating a set of BWPs available to use for communication. At 906, the UE performs communications on at least one of the set of BWPs.

Figure 10:
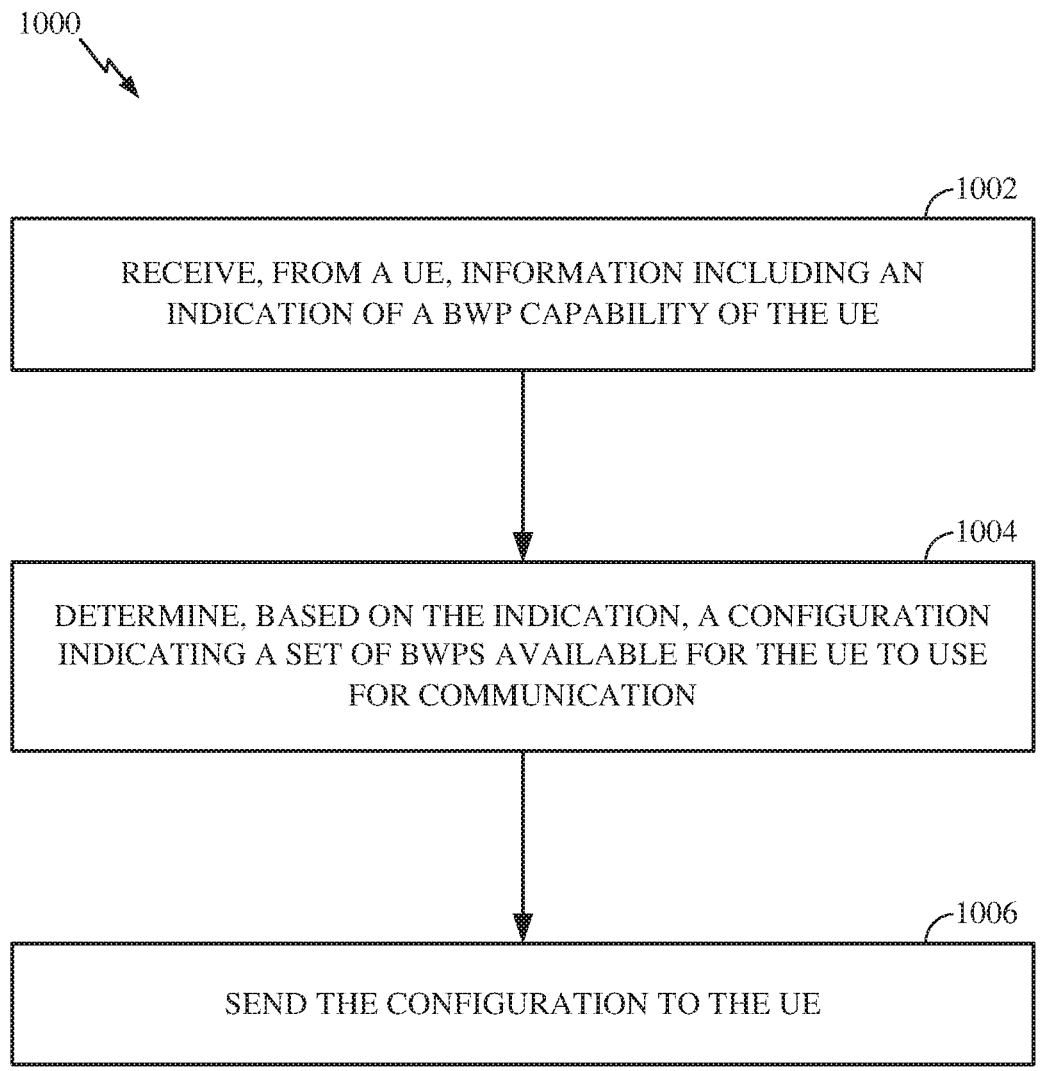
FIG. 10 illustrates example operations for wireless communications performed by a base station, in accordance with certain aspects of the present disclosure.

FIG. 10 illustrates example operations 1000 for wireless communications, in accordance with aspects of the present disclosure. Operations 1000 may be performed, for example, by a base station (e.g., a gNB), such as BS 110 shown in FIG. 1.

Operations 1000 begin, at 1002, where the base station receives, from a UE, information that includes an indication of a BWP capability of the UE. At 1004, the base station determines, based on the indication, a configuration indicating a set of BWPs available for the UE to use for communication. At 1006, the base station sends the configuration to the UE.

Figure 11:
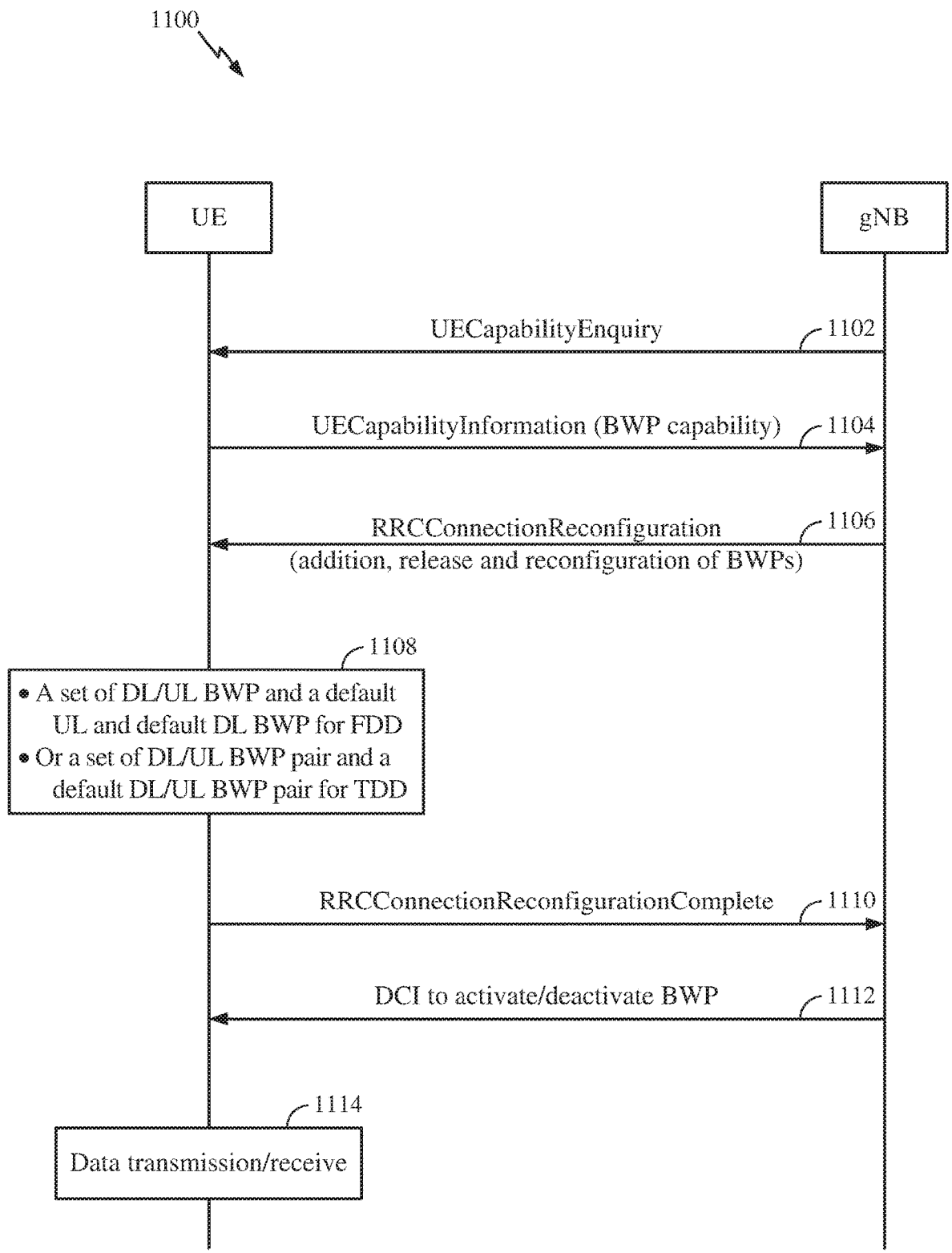
FIG. 11 illustrates an example call flow of a radio resource control (RRC) procedure, in accordance with certain aspects of the present disclosure.

In some aspects, the gNB may configure a UE in a connected state via RRC with a set of BWPs, based on a capability of the UE. FIG. 11 illustrates an example call flow 1100 of a RRC procedure between a UE and gNB that can be used to configure a UE with one or more BWPs, in accordance with certain aspects of the present disclosure.

As shown, the gNB may send a request (e.g., UECapabilityEnquiry) to the UE for one or more capabilities of the UE (1102). In response to the request, the UE may send a message (e.g., UECapabilityInformation) that includes the UE capabilities to the gNB (1104). The UE capabilities may include at least one of a BWP capability or CA capability. In one aspect, the BWP capability of the UE may include a maximum receive bandwidth of the UE. In one aspect, the BWP capability may include a list of supported receive bandwidths of the UE. In one aspect, the BWP capability may include an indication of the UE's capability to switch from one BWP to another BWP. For example, the BWP switch capability may include at least one of a list of latencies of all BWP switch combinations (e.g., between BWPs) or a maximum latency of all the BWP switch combinations (e.g., between BWPs). In some, aspects, the BWP capability may include any combination of the above. The granularity of the BWP capability may be per component carrier (CC) or per CA combination. That is, the BWP capability may include an indication of the BWP capability for each of one or more CCs or for each of one or more CA configurations.

The gNB may configure a set of DL/UL BWPs based on the UE's BWP capability. The configured BWPs may include a set of DL/UL BWPs and a default UL (or fallback UL) and default DL BWP for FDD operation; a set of DL/UL BWP pair and a default DL/UL BWP pair for TDD operation; a set of DL BWPs and one default DL BWP for supplemental downlink (SDL) operation; or a set of UL BWPs and one default UL BWP (or fallback UL BWP) for supplemental uplink (SUL) operation. In some aspects, the default DL BWP may be used for fallback operation (e.g., monitoring for paging message(s), system information, etc.). In some aspects, the default UL BWP or an explicitly configured fallback UL BWP may be used for a contention-based random access operation. For example, in some situations, there may be a large overhead if all UL BWPs are configured with RACH resources. Accordingly, the UE may use a single default UL BWP to send a random access channel (RACH) to the gNB. In some cases, the UE may use the default UL BWP or an explicitly configured fallback UL BWP for at least one of UL OOS, on-demand SI, beam recovery, scheduling request (e.g., if no PUCCH is available), etc. If the UE does not have such an UL BWP configured, it may use the initial active BWP to perform contention-based random access in both idle and connected mode unless instructed by the network otherwise. As used herein, a default (UL/DL) BWP may refer to a fallback (UL/DL) BWP or an initial (UL/DL) BWP.

As shown, once the gNB determines the set of BWPs, the gNB may configure the UE with the set of BWPs via a dedicated RRC reconfiguration message (1106). The dedicated RRC reconfiguration message may trigger at least one of an addition of BWPs, release of BWPs, or reconfiguration of BWPs (e.g., initially or relative to a previous configuration). Such BWP release and/or reconfiguration may be used for load balancing and/or in situations where channel conditions change.

In some cases, the gNB may not be aware of the active BWP being used by the UE for communication. In these cases, when the gNB triggers a release of one or more BWPs from the UE's configured BWPs, the active BWP of the UE may be released by explicit BWP release signaling (e.g., in RRC reconfiguration message).

In one aspect, in response to a release of an active BWP, the UE may fall back (or switch) to one or more default BWPs. For example, the default BWP(s) may include a default DL BWP (e.g., for FDD/SDL) and default UL BWP (e.g., for FDD/SUL) or default DL/UL BWP pair (e.g., for TDD).

In one aspect, the RRC reconfiguration message may include an explicit indication of a new active BWP. Thus, in this aspect, in response to a release of an active BWP, the UE may switch from the released active BWP to the new active BWP. For example, the UE may perform an intra-cell handover (or similar operation) from the source BWP to the target BWP, where the source BWP is the BWP released, by the reconfiguration message and the target BWP is the new default BWP given by the reconfiguration message.

In one aspect, assuming the gNB aware of the UE's active BWP, the RRC reconfiguration message may refrain from releasing any active BWP of the UE. That is, the RRC reconfiguration message may be prohibited from releasing an active BWP. In these cases, the RAN may change the active BWP to the other active BWP before the release.

In some aspects, release of an active BWP may be implicitly triggered based on one or more conditions. For example, in a primary cell (Pcell)/primary serving cell (PScell), the BWP release may be implicitly triggered by at least one of a radio link failure (RLF), PCell handover, or PSCell change. In cases where a secondary cell (SCell) is changed and/or released, the BWPs configured in the SCell may be implicitly released.

As shown in this particular example, the UE receives at least one of: (1) a set of DL/UL BWP and a default UL and default DL BWP for FDD; or (2) a set of DL/UL BWP pair and a default DL/UL BWP pair for TDD (1108). Once the UE receives the set of BWPs, the UE may send a RRCConnectionReconfigurationComplete message to the gNB (1110). The gNB may activate/deactivate (BWP(s)) via DCI (1112). The UE may use the activated BWP(s) for communications (e.g., data transmission/reception) (1114). In some aspects, performing the communications may include retuning and performing a random access procedure on one of the configured BWPs. The random access may be contention based random access or contention-free access.

As noted, a UE may be configured with up to one initial BWP (e.g., for initial access and specified in the system information) and up to four active BWPs (e.g., configured by RRC dedicated signaling after the UE is connected). However, in some cases, a BWP may not be configured with physical random access channel (PRACH) resources, because PRACH resources may be expensive. Thus, it may be desirable to provide techniques that the UE can use to select a BWP when the UE has to perform random access in RRC connected mode.

In some aspects, the UE may be configured to always switch back to the initial BWP to perform random access, regardless of whether the current active UL BWP has random access resources. For example, the UE may always perform RACH on the initial active DL/UL BWP (e.g., BWP for initial access in idle mode) of the target cell. The RAN may then reconfigure the UE with the new default BWP and set of BWPs afterwards. However, always switching back to the initial BWP may increase the access load on the initial BWP. As the initial BWP may have a narrow bandwidth (e.g., to support all categories of UEs), and thus a small PRACH capacity, it may not be desirable to have such an increased access load on the initial BWP.

In some aspects, performing the communications may include retuning and performing a random access procedure on the default BWP for uplink communication if a current active UL BWP does not have random access resources. In some aspects, performing the communications may include performing a random access procedure on the initial active uplink BWP indicated in system information if a default uplink BWP is not configured and a current active UL BWP does not have random access resources. That is, if the UE's active UL BWP is configured with PRACH resource(s), the UE may perform random access in the active UL BWP; otherwise, the UE may switch to the initial BWP to perform random access.

In some, aspects, if the UE has more than one UL BWP configured with PRACH resource(s), but the active UL BWP in which the UE currently operates does not have PRACH resource(s), the UE may choose one of the other UL BWPs configured with PRACH resource(s) to use for random access, instead of falling hack/switching to the initial UL BWP to perform the random access procedure. In some cases, the UE may choose which of the configured UL BWPs (with PRACH resources) to use for the random access procedure based on a RACH occasion associated with each of the configured UL BWPs. For example, in some cases, the UE may choose the UL BWP that has the more frequent RACH occasion. Additionally, or alternatively, the UE may choose which of the configured UL BWPs (with PRACH resources) to use for the random access procedure based on a random access response (RAR) window configured for each UL BWP. For example, in some cases, the UE may choose the UL BWP that has the shortest RAR window, so that it may receive a RAR sooner.

According to certain aspects, the gNB may also configure the UE with a set of BWPs to use in a mobility procedure (e.g., RACH, handover, etc.). For example, for handover in NR, if the target cell uses wideband operation, then the UE should know in which UL BWP to perform RACH and also in which DL BWP to monitor for the RACH response. Such information may enable the UE to reduce access latency without reading system information of the target cell.

In one aspect, the network may provide the default DL BWP (e.g., for monitoring for the RACH response from the gNB) and default UL BWP (e.g., for sending a PRACH transmission) of the target cell in the handover (HO) command. Doing so enables the UE to directly perform a contention-based or contention-free RACH.

In one aspect, at least one UL BWP with PRACH resource configuration and one DL BWP with command search space configuration for RACH procedure, of the target cell may be signaled in a HO command. The provided UL BWP and DL BWP may be different from the default BWP and initial active BWP. If more than one DL/UL BWPs are provided, the UE can pick one of the BWPs, and the gNB of the target cell may monitor all the provided UL BWPs.

According to certain aspects, the gNB may also configure the UE with a set of BWPs to use for paging and system information and/or emergency information (e.g., such as earthquake and tsunami warning service (ETWS) and/or commercial mobile alert system (CMAS) notifications). In some cases, a gNB may not configure a common search space in each DL BWP to monitor paging and system information. Thus in cases when an active DL BWP is not configured with a common search space for paging and system information, the UE may have to retune to a DL BWP with a common search space.

In one aspect, the gNB may use dedicated signaling for system information delivery. For example, the UE may be configured to monitor for the system information and RACH response in the active DL BWP. In this aspect, the UE may not have to perform a BWP switch.

In one aspect, the gNB may define a returning gap (e.g., configured by the network) and refrain from scheduling data transmissions/receptions for the UE during the retuning gap. The retuning gap may be triggered when the gNB sends DCI to switch the BWP. In some aspects, the retuning gap may be set based on one or more retuning latencies (e.g., the retuning latency may be different for different BWP switches). In one aspect, the gNB may configure a fixed gap whose duration is the largest duration of all combinations of BWP switch(es) (e.g., latency of BWP1 to BWP2, latency of BWP2 to BWP3, etc.). In one aspect, the UE may report all possible combinations of BWP switch(es) (e.g., latency of BWP1 to BWP2, latency of BWP2 to BWP3, etc.), and the gNB and UE may maintain the same BWP switch latency table. The retuning gap may be set based on the BWP switch latency table.

In one aspect, the UE may be configured to receive system information (e.g., paging/system information/emergency notifications) in the default DL BWP. For example, the system information may be sent in only the default DL BWP. In some cases, when the UE fallbacks to the default DL BWP (e.g., after a timer expires), the UE may receive the system information. In some cases, the gNB may trigger the UE with DCI to switch to a default DL BWP for receiving system information.

Figure 12:
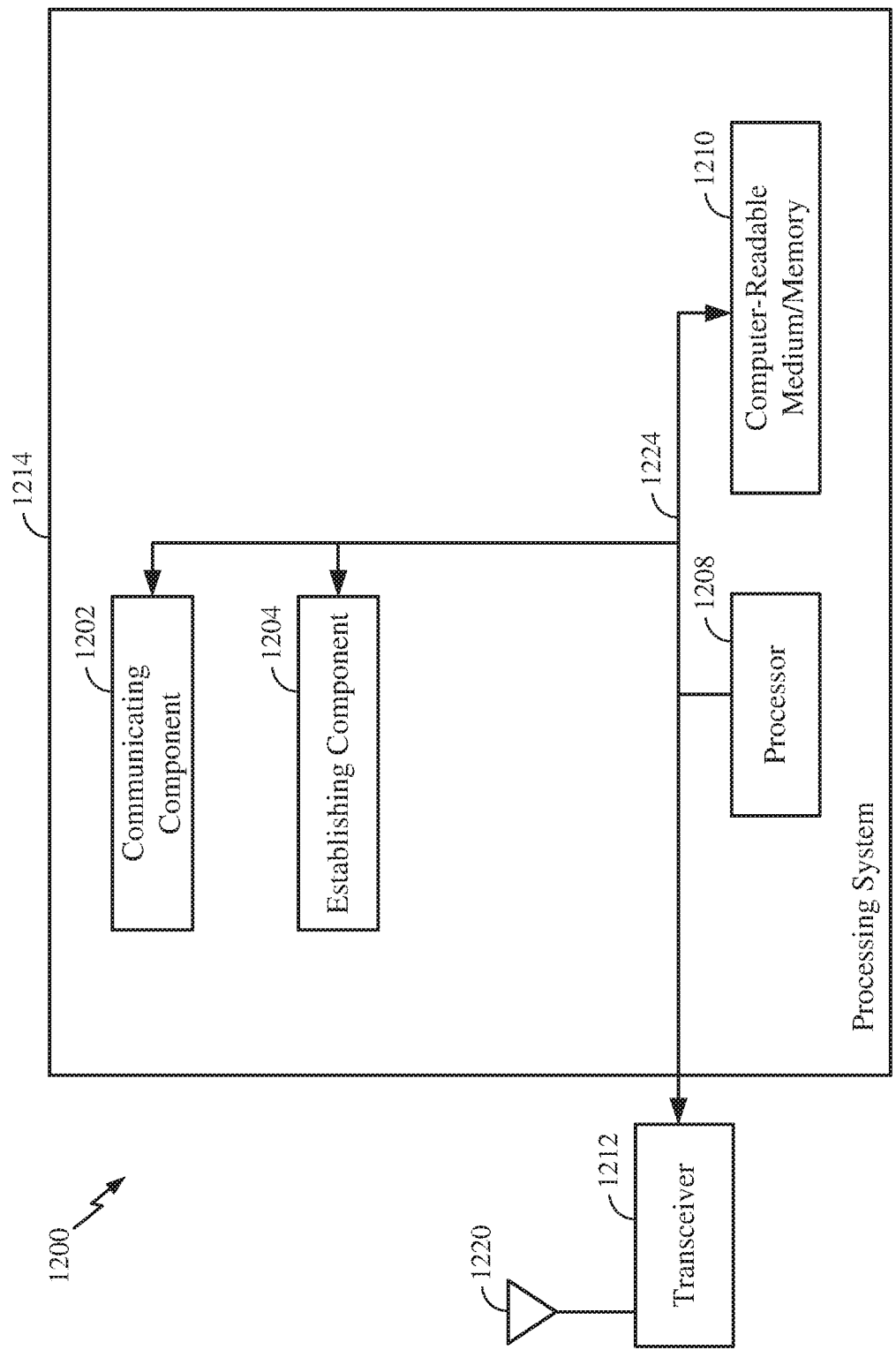
FIG. 12 illustrates a communications device that may include various components configured to perform operations for the techniques disclosed herein, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 9-10. The communications device 1200 includes a processing system 1214 coupled to a transceiver 1212. The transceiver 1212 is configured to transmit and receive signals for the communications device 1200 via an antenna 1220, such as the various signal described herein. The processing system 1214 may be configured to perform processing functions for the communications device 1200, including processing signals received and/or to be transmitted by the communications device 1200.

The processing system 1214 includes a processor 1208 coupled to a computer-readable medium/memory 1210 via a bus 1224. In certain aspects, the computer-readable medium/memory 1210 is configured to store instructions that when executed by processor 1208, cause the processor 1208 to perform the operations illustrated in FIGS. 9-11, or other operations for performing the various techniques discussed herein.

In certain aspects, the processing system 1214 further includes a communicating component 1202 for performing the operations illustrated at 902, 904 and 906 in FIG. 9 and/or operations 1002 and 1006 in FIG. 10. Additionally, the processing system 1214 includes an establishing (BWP configuration) component 1204 for performing the operations illustrated at 1004 in FIG. 10. The communicating component 1202 and establishing component 1204 may be coupled to the processor 1208 via bus 1224. In certain aspects, the communicating component 1202 and establishing component 1204 may be hardware circuits. In certain aspects, the communicating component 1202 and establishing component 1204 may be software components that are executed and run on processor 1208.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a a-a-a, a-a-b, a-a-c, a-b-b, a-c-c, b-b, b-b-b, b-b-c, c-c, and c-c-c or any other ordering of a, b, and c).

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for requesting, means for signaling, means for sending, means for indicating, and/or means for communicating may include one or more of a transmit processor 420, a TX MIMO processor 430, controller/processor 440, or antenna(s) 434 of the base station 110 and/or the transmit processor 464, a TX MIMO processor 466, controller/processor 480, or antenna(s) 452 of the user equipment 120. Means for receiving and/or means for communicating may include one or more of a receive processor 438, controller/processor 440, and/or antenna(s) 434 of the base station 110 and/or receive processor 458, controller/processor 480, and/or antenna(s) 452 of the user equipment 120.

Additionally, means for generating, means for performing, means for indicating, means for (re)configuring, means for requesting, means for triggering, means for switching, means for (re)tuning, means for releasing, means for adding, means for determining, means for monitoring, means for refraining, means for detecting, means for paging, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include instructions for performing the operations described herein and illustrated in FIGS. 9-11.

Further, it should be appreciated that modules and/or other appropriate means for performing the methods and techniques described herein can be downloaded and/or otherwise obtained, by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   sending, to a base station (BS), information comprising a plurality of bandwidth part (BWP) capability indications of the UE, wherein the plurality of BWP capability indications comprise (i) a respective BWP capability of the UE for each of a plurality of component carriers or (ii) a respective BWP capability of the UE for each of a plurality of carrier aggregation (CA) configurations;
   receiving, in response to the information, a configuration from the BS indicating a set of BWPs available to use for communication; and
   performing communications on at least one of the set of BWPs.

2. The method of claim 1, wherein the information further comprises an indication of a CA capability of the UE.

3. The method of claim 1, further comprising:
   receiving from the BS a request for one or more capabilities of the UE, wherein the information is sent in response to the request.

4. The method of claim 1, wherein the information further comprises a maximum receive bandwidth of the UE.

5. The method of claim 1, wherein the information further comprises an indication of one or more receive bandwidths supported by the UE.

6. The method of claim 1, wherein the plurality of BWP capability indications further comprise an indication of a capability of the UE to switch from at least a first one or more BWPs to at least a second one or more BWPs.

7. The method of claim 6, wherein the indication of the capability of the UE to switch from the first one or more BWPs to the second one or more BWPs comprises a latency associated with switching from each combination of the first one or more BWPs to the second one or more BWPs.

8. The method of claim 6, wherein the indication of the capability of the UE to switch from the first one or more BWPs to the second one or more BWPs comprises a maximum latency associated with switching from the first one or more BWPs to the second one or more BWPs.

9. The method of claim 1, wherein the configuration is received via a radio resource control (RRC) reconfiguration message.

10. The method of claim 9, wherein the RRC reconfiguration message triggers at least one of an addition of one or more BWPs to the set of BWPs, a release of one or more BWPs from the set of BWPs, or a reconfiguration of one or more BWPs in the set of BWPs.

11. The method of claim 9, wherein the set of BWPs in the configuration comprises at least one of a default downlink BWP or a default uplink BWP.

12. The method of claim 11, wherein performing the communications comprises retuning and performing a random access procedure on the default uplink BWP.

13. The method of claim 12, wherein the random access procedure is performed on the default uplink BWP if a current active uplink BWP does not have random access resources.

14. The method of claim 12, wherein the random access procedure is a contention-based random access procedure or a contention-free access procedure.

15. The method of claim 11, wherein performing the communications comprises performing a random access procedure on an initial active uplink BWP indicated in system information if the default uplink BWP is not configured and a current active uplink BWP does not have random access resources.

16. The method of claim 11, wherein performing the communications comprises:
determining that a current active uplink BWP does not have random access resources;
after the determination, switching from the current active uplink BWP that does not have random access resources to another uplink BWP that does have random access resources; and
performing a random access procedure on the other uplink BWP.

17. The method of claim 16, wherein:
the other uplink BWP is one of a plurality of uplink BWPs configured with random access resources; and
the other uplink BWP is not the default uplink BWP.

18. The method of claim 11, wherein performing the communications comprises monitoring for system information and random access response on the default downlink BWP.

19. The method of claim 9, wherein the set of BWPs in the configuration comprises:
a set of BWPs for frequency division duplex (FDD) operation;
a set of BWPs for time division duplex (TDD) operation;
a set of downlink BWPs for supplemental downlink (SDL) operation; or
a set of uplink BWPs for supplemental uplink (SUL) operation.

20. The method of claim 19, wherein:
the set of BWPs for FDD operation comprises a default uplink BWP and default downlink BWP for FDD operation;
the set of BWPs for TDD operation comprises a default BWP for downlink and uplink;
the set of downlink BWPs for SDL operation comprises a default downlink BWP for SDL operation; and
the set of uplink BWPs for SUL operation comprises a default uplink BWP for SUL operation.

21. The method of claim 9, wherein the RRC reconfiguration message triggers a release of a first active BWP used by the UE for communications.

22. The method of claim 21, wherein:
performing the communications comprises switching to a default BWP for the communications in response to the release; and
the default BWP comprises a default downlink BWP, a default uplink BWP or a default BWP pair for uplink and downlink.

23. The method of claim 21, wherein:
the RRC reconfiguration message comprises an indication of a second active BWP for the UE to use for communication; and
performing the communications comprises switching from the first active BWP to the second active BWP for the communications in response to the release.

24. The method of claim 9, wherein the RRC reconfiguration message refrains from releasing an active BWP used by the UE for communication.

25. The method of claim 1, wherein:
performing the communications comprises communicating on a first active BWP in a first cell;
detecting at least one of a radio link failure in the first cell, a handover from the first cell or a change in the first cell; and
triggering a release of the first active BWP in response to the detection.

26. The method of claim 1, further comprising:
sending a random access preamble to another BS on an uplink BWP for the other BS; and
monitoring for a random access response from the other BS on a downlink BWP for the other BS.

27. The method of claim 26, further comprising receiving a handover command, wherein an indication of the uplink BWP and downlink BWP for the other BS is provided in the handover command.

28. The method of claim 1, further comprising monitoring for at least one of a paging message or system information in an active downlink BWP of the set of BWPs.

29. The method of claim 1, further comprising:
receiving a trigger to switch from an active downlink BWP of the set of BWPs to a default downlink BWP of the set of BWPs to monitor for at least one of a paging message or system information;
switching from the active downlink BWP to the default downlink BWP in response to the trigger; and
monitoring for at least one of the paging message or the system information on the default downlink BWP.

30. The method of claim 29, wherein the trigger is received via downlink control information (DCI).

31. The method of claim 29, where the default downlink BWP is a fallback downlink BWP or an initial downlink BWP.

32. A method for wireless communications by a base station (BS), comprising:
receiving, from a user equipment (UE), information comprising a plurality of bandwidth part (BWP) capability indications of the UE, wherein the plurality of BWP capability indications comprise (i) a respective BWP capability of the UE for each of a plurality of component carriers or (ii) a respective BWP capability of the UE for each of a plurality of carrier aggregation (CA) configurations;
determining, based on the information, a configuration indicating a set of BWPs available for the UE to use for communication; and
sending the configuration to the UE.

33. The method of claim 32, wherein the information further comprises an indication of a CA capability of the UE.

34. The method of claim 32, further comprising sending a request for one or more capabilities of the UE, wherein the information is received in response to the request.

35. The method of claim 32, wherein the information further comprises a maximum receive bandwidth of the UE.

36. The method of claim 32, wherein the information further comprises an indication of one or more receive bandwidths supported by the UE.

37. The method of claim 32, wherein the plurality of BWP capability indications further comprise an indication of a capability of the UE to switch from at least a first one or more BWPs to at least a second one or more BWPs.

38. The method of claim 37, wherein the indication of the capability of the UE to switch from the first one or more BWPs to the second one or more BWPs comprises a latency associated with switching from each combination of the first one or more BWPs to the second one or more BWPs.

39. The method of claim 37, wherein the indication of the capability of the UE to switch from the first one or more BWPs to the second one or more BWPs comprises a maximum latency associated with switching from the first one or more BWPs to the second one or more BWPs.

40. The method of claim 32, wherein the configuration is sent via a radio resource control (RRC) reconfiguration message.

41. The method of claim 40, wherein the RRC reconfiguration message triggers at least one of an addition of one or more BWPs to the set of BWPs, a release of one or more BWPs from the set of BWPs, or a reconfiguration of one or more BWPs in the set of BWPs.

42. The method of claim 40, wherein the set of BWPs in the configuration comprises at least one of a default downlink BWP or a default uplink BWP.

43. The method of claim 40, wherein the set of BWPs in the configuration comprises:
a set of BWPs for frequency division duplex (FDD) operation;
a set of BWPs for time division duplex (TDD) operation;
a set of downlink BWPs for supplemental downlink (SDL) operation; or
a set of uplink BWPs for supplemental uplink (SUL) operation.

44. The method of claim 43, wherein:
the set of BWPs for FDD operation comprises a default uplink BWP and default downlink BWP for FDD operation;
the set of BWPs for TDD operation comprises a default BWP for downlink and uplink;
the set of downlink BWPs for SDL operation comprises a default downlink BWP for SDL operation; and
the set of uplink BWPs for SUL operation comprises a default uplink BWP for SUL operation.

45. The method of claim 40, wherein the RRC reconfiguration message triggers a release of a first active BWP used by the UE for communications.

46. The method of claim 45, wherein the RRC reconfiguration message comprises an indication of a second active BWP for the UE to use for communication.

47. The method of claim 40, wherein the RRC reconfiguration message refrains from releasing an active BWP used by the UE for communication.

48. The method of claim 32, further comprising:
receiving a random access preamble from a UE on an uplink BWP for the BS; and
sending a random access response to the UE on a downlink BWP for the BS.

49. The method of claim 48, further comprising sending an indication of the uplink BWP and the downlink BWP to the UE via a handover command.

50. The method of claim 49, wherein:
the uplink BWP is a default uplink BWP of the BS; and
the BS is a target cell.

51. The method of claim 49, wherein:
the uplink BWP is an initial active uplink BWP of the BS; and
the BS is a target cell.

52. The method of claim 51, further comprising sending an indication to find the initial active uplink BWP to the UE via a handover command.

53. The method of claim 32, further comprising:
sending at least one of a paging message or system information to the UE on an active downlink BWP of the set of BWPs.

54. The method of claim 32, further comprising:
triggering the UE to switch from monitoring from a first active downlink BWP to a second downlink BWP for at least one of a paging message or system information;
configuring a retuning time for the switch from the first active downlink BWP to the second downlink BWP; and
refraining from sending at least one of a paging message or system information during the retuning time.

55. The method of claim 32, further comprising sending at least one of a paging message or system information to the UE on a default downlink BWP of the set of BWPs.

56. The method of claim 55, wherein the default downlink BWP is a fallback downlink BWP or an initial downlink BWP.

57. An apparatus for wireless communication, comprising:
a transmitter configured to transmit, to a base station (BS), information comprising a plurality of bandwidth part (BWP) capability indications of the apparatus, wherein the plurality of BWP capability indications comprise (i) a respective BWP capability of the apparatus for each of a plurality of component carriers or (ii) a respective BWP capability of the apparatus for each of a plurality of carrier aggregation (CA) configurations;
a receiver configured to receive, in response to the information, a configuration from the BS indicating a set of BWPs available to use for communication;
at least one processor configured to perform communications on at least one of the set of BWPs; and
a memory coupled to the at least one processor.

58. The apparatus of claim 57, wherein the information further comprises an indication of a CA capability of the apparatus.

59. The apparatus of claim 57, wherein:
the receiver is further configured to receive from the BS a request for one or more capabilities of the apparatus; and
the transmitter transmits the information in response to the request.

60. The apparatus of claim 57, wherein the information further comprises a maximum receive bandwidth of the apparatus.

61. The apparatus of claim 57, wherein the information further comprises an indication of one or more receive bandwidths supported by the apparatus.

62. The apparatus of claim 57, wherein the plurality of BWP capability indications further comprise an indication of a capability of the apparatus to switch from at least a first one or more BWPs to at least a second one or more BWPs.

63. The apparatus of claim 62, wherein the indication of the capability of the apparatus to switch from the first one or more BWPs to the second one or more BWPs comprises a latency associated with switching from each combination of the first one or more BWPs to the second one or more BWPs.

64. The apparatus of claim 62, wherein the indication of the capability of the apparatus to switch from the first one or more BWPs to the second one or more BWPs comprises a maximum latency associated with switching from the first one or more BWPs to the second one or more BWPs.

65. The apparatus of claim 57, wherein the configuration is received via a radio resource control (RRC) reconfiguration message.

66. The apparatus of claim 65, wherein the RRC reconfiguration message triggers at least one of an addition of one or more BWPs to the set of BWPs, a release of one or more BWPs from the set of BWPs, or a reconfiguration of one or more BWPs in the set of BWPs.

67. The apparatus of claim 65, wherein the set of BWPs in the configuration comprises at least one of a default downlink BWP or a default uplink BWP.

68. The apparatus of claim 67, wherein the at least one processor is configured to perform the communications by retuning and performing a random access procedure on the default uplink BWP.

69. The apparatus of claim 68, wherein the random access procedure is performed on the default uplink BWP if a current active uplink BWP does not have random access resources.

70. The apparatus of claim 68, wherein the random access procedure is a contention-based random access procedure or a contention-free access procedure.

71. The apparatus of claim 67, wherein the at least one processor is configured to perform the communications by performing a random access procedure on an initial active uplink BWP indicated in system information if the default uplink BWP is not configured and a current active uplink BWP does not have random access resources.

72. The apparatus of claim 67, wherein the at least one processor is configured to perform the communications by:
determining that a current active uplink BWP does not have random access resources;
after the determination, switching from the current active uplink BWP that does not have random access resources to another uplink BWP that does have random access resources; and
performing a random access procedure on the other uplink BWP.

73. The apparatus of claim 72, wherein:
the other uplink BWP is one of a plurality of uplink BWPs configured with random access resources; and
the other uplink BWP is not the default uplink BWP.

74. The apparatus of claim 67, wherein the at least one processor is configured to perform the communications by monitoring for system information and random access response on the default downlink BWP.

75. The apparatus of claim 65, wherein the set of BWPs in the configuration comprises:
a set of BWPs for frequency division duplex (FDD) operation;
a set of BWPs for time division duplex (TDD) operation;
a set of downlink BWPs for supplemental downlink (SDL) operation; or
a set of uplink BWPs for supplemental uplink (SUL) operation.

76. The apparatus of claim 75, wherein:
the set of BWPs for FDD operation comprises a default uplink BWP and default downlink BWP for FDD operation;
the set of BWPs for TDD operation comprises a default BWP for downlink and uplink;
the set of downlink BWPs for SDL operation comprises a default downlink BWP for SDL operation; and
the set of uplink BWPs for SUL operation comprises a default uplink BWP for SUL operation.

77. The apparatus of claim 65, wherein the RRC reconfiguration message triggers a release of a first active BWP used by the apparatus for communications.

78. The apparatus of claim 77, wherein:
the at least one processor is configured to perform the communications by switching to a default BWP for the communications in response to the release; and
the default BWP comprises a default downlink BWP, a default uplink BWP or a default BWP pair for uplink and downlink.

79. The apparatus of claim 77, wherein:
the RRC reconfiguration message comprises an indication of a second active BWP for the apparatus to use for communication; and
the at least one processor is configured to perform the communications by switching from the first active BWP to the second active BWP for the communications in response to the release.

80. The apparatus of claim 65, wherein the RRC reconfiguration message refrains from releasing an active BWP used by the apparatus for communication.

81. The apparatus of claim 57, wherein:
the at least one processor is configured to perform the communications by communicating on a first active BWP in a first cell;
detecting at least one of a radio link failure in the first cell, a handover from the first cell or a change in the first cell; and
triggering a release of the first active BWP in response to the detection.

82. The apparatus of claim 57, wherein:
the transmitter is further configured to transmit a random access preamble to another BS on an uplink BWP for the other BS; and
the at least one processor is configured to monitor for a random access response from the other BS on a downlink BWP for the other BS.

83. The apparatus of claim 82, wherein:
the receiver is further configured to receive a handover command; and
an indication of the uplink BWP and downlink BWP for the other BS is provided in the handover command.

84. The apparatus of claim 57, wherein the at least one processor is further configured to monitor for at least one of a paging message or system information in an active downlink BWP of the set of BWPs.

85. The apparatus of claim 57, wherein:
the receiver is configured to receive a trigger to switch from an active downlink BWP of the set of BWPs to a default downlink BWP of the set of BWPs to monitor for at least one of a paging message or system information; and
the at least one processor is further configured to:
switch from the active downlink BWP to the default downlink BWP in response to the trigger; and
monitoring for at least one of the paging message or the system information on the default downlink BWP.

86. The apparatus of claim 85, wherein the trigger is received via downlink control information (DCI).

87. The apparatus of claim 85, where the default downlink BWP is a fallback downlink BWP or an initial downlink BWP.

88. An apparatus for wireless communication, comprising:
a receiver configured to receive, from a user equipment (UE), information comprising a plurality of bandwidth part (BWP) capability indications of the UE, wherein the plurality of BWP capability indications comprise (i) a respective BWP capability of the UE for each of a plurality of component carriers or (ii) a respective BWP capability of the UE for each of a plurality of carrier aggregation (CA) configurations;
at least one processor configured to determine, based on the information, a configuration indicating a set of BWPs available for the UE to use for communication;
a transmitter configured to transmit the configuration to the UE; and
a memory coupled to the at least one processor.

89. The apparatus of claim 88, wherein the information further comprises an indication of a CA capability of the UE.

90. The apparatus of claim 88, wherein:
the transmitter is further configured to transmit a request for one or more capabilities of the UE; and
the receiver receives the information in response to the request.

91. The apparatus of claim 88, wherein the information further comprises a maximum receive bandwidth of the UE.

92. The apparatus of claim 88, wherein the information further comprises an indication of one or more receive bandwidths supported by the UE.

93. The apparatus of claim 88, wherein the plurality of BWP capability indications further comprise an indication of a capability of the UE to switch from at least a first one or more BWPs to at least a second one or more BWPs.

94. The apparatus of claim 93, wherein the indication of the capability of the UE to switch from the first one or more BWPs to the second one or more BWPs comprises a latency associated with switching from each combination of the first one or more BWPs to the second one or more BWPs.

95. The apparatus of claim 93, wherein the indication of the capability of the UE to switch from the first one or more BWPs to the second one or more BWPs comprises a maximum latency associated with switching from the first one or more BWPs to the second one or more BWPs.

96. The apparatus of claim 88, wherein the configuration is sent via a radio resource control (RRC) reconfiguration message.

97. The apparatus of claim 96, wherein the RRC reconfiguration message triggers at least one of an addition of one or more BWPs to the set of BWPs, a release of one or more BWPs from the set of BWPs, or a reconfiguration of one or more BWPs in the set of BWPs.

98. The apparatus of claim 96, wherein the set of BWPs in the configuration comprises at least one of a default downlink BWP or a default uplink BWP.

99. The apparatus of claim 96, wherein the set of BWPs in the configuration comprises:
a set of BWPs for frequency division duplex (FDD) operation;
a set of BWPs for time division duplex (TDD) operation;
a set of downlink BWPs for supplemental downlink (SDL) operation; or
a set of uplink BWPs for supplemental uplink (SUL) operation.

100. The apparatus of claim 99, wherein:
the set of BWPs for FDD operation comprises a default uplink BWP and default downlink BWP for FDD operation;
the set of BWPs for TDD operation comprises a default BWP for downlink and uplink;
the set of downlink BWPs for SDL operation comprises a default downlink BWP for SDL operation; and
the set of uplink BWPs for SUL operation comprises a default uplink BWP for SUL operation.

101. The apparatus of claim 96, wherein the RRC reconfiguration message triggers a release of a first active BWP used by the UE for communications.

102. The apparatus of claim 101, wherein the RRC reconfiguration message comprises an indication of a second active BWP for the UE to use for communication.

103. The apparatus of claim 96, wherein the RRC reconfiguration message refrains from releasing an active BWP used by the UE for communication.

104. The apparatus of claim 88, wherein:
the receiver is further configured to receive a random access preamble from a UE on an uplink BWP for the apparatus; and
the transmitter is further configured to transmit a random access response to the UE on a downlink BWP for the apparatus.

105. The apparatus of claim 104, wherein:
the transmitter is further configured to transmit an indication of the uplink BWP and the downlink BWP to the UE via a handover command.

106. The apparatus of claim 105, wherein:
the uplink BWP is a default uplink BWP of the apparatus; and
the apparatus is a target cell.

107. The apparatus of claim 105, wherein:
the uplink BWP is an initial active uplink BWP of the apparatus; and
the apparatus is a target cell.

108. The apparatus of claim 107, wherein the transmitter is further configured to transmit an indication to find the initial active uplink BWP to the UE via a handover command.

109. The apparatus of claim 88, wherein the transmitter is further configured to transmit at least one of a paging message or system information to the UE on an active downlink BWP of the set of BWPs.

110. The apparatus of claim 88, wherein:
the at least one processor is further configured to:
trigger the UE to switch from monitoring from a first active downlink BWP to a second downlink BWP for at least one of a paging message or system information; and
configure a retuning time for the switch from the first active downlink BWP to the second downlink BWP; and
the transmitter is further configured to refrain from sending at least one of a paging message or system information during the retuning time.

111. The apparatus of claim 88, wherein the transmitter is further configured to transmit at least one of a paging message or system information to the UE on a default downlink BWP of the set of BWPs.

112. The apparatus of claim 111, wherein the default downlink BWP is a fallback downlink BWP or an initial downlink BWP.

113. An apparatus for wireless communication, comprising:
- means for sending, to a base station (BS), information comprising a plurality of bandwidth part (BWP) capability indications of the apparatus, wherein the plurality of BWP capability indications comprise (i) a respective BWP capability of the apparatus for each of a plurality of component carriers or (ii) a respective BWP capability of the apparatus for each of a plurality of carrier aggregation (CA) configurations;
- means for receiving, in response to the information, a configuration from the BS indicating a set of BWPs available to use for communication; and
- means for performing communications on at least one of the set of BWPs.

114. An apparatus for wireless communication, comprising:
- means for receiving, from a user equipment (UE), information comprising a plurality of bandwidth part (BWP) capability indications of the UE, wherein the plurality of BWP capability indications comprise (i) a respective BWP capability of the UE for each of a plurality of component carriers or (ii) a respective BWP capability of the UE for each of a plurality of carrier aggregation (CA) configurations;
- means for determining, based on the information, a configuration indicating a set of BWPs available for the UE to use for communication; and
- means for sending the configuration to the UE.

115. A non-transitory computer-readable medium having computer executable code stored thereon for wireless communication by an apparatus, the computer executable code comprising:
- code for sending, to a base station (BS), information comprising a plurality of bandwidth part (BWP) capability indications of the apparatus, wherein the plurality of BWP capability indications comprise (i) a respective BWP capability of the apparatus for each of a plurality of component carriers or (ii) a respective BWP capability of the apparatus for each of a plurality of carrier aggregation (CA) configurations;
- code for receiving, in response to the information, a configuration from the BS indicating a set of BWPs available to use for communication; and
- code for performing communications on at least one of the set of BWPs.

116. A non-transitory computer-readable medium having computer executable code stored thereon for wireless communication by an apparatus, the computer executable code comprising:
- code for receiving, from a user equipment (UE), information comprising a plurality of bandwidth part (BWP) capability indications of the UE, wherein the plurality of BWP capability indications comprise (i) a respective BWP capability of the UE for each of a plurality of component carriers or (ii) a respective BWP capability of the UE for each of a plurality of carrier aggregation (CA) configurations;
- code for determining, based on the information, a configuration indicating a set of BWPs available for the UE to use for communication; and
- code for sending the configuration to the UE.

* * * * *